(12) United States Patent
Vuletic et al.

(10) Patent No.: US 8,185,696 B2
(45) Date of Patent: May 22, 2012

(54) VIRTUAL MEMORY WINDOW WITH DYNAMIC PREFETCHING SUPPORT

(75) Inventors: Miljan Vuletic, Lausanne (CH); Laura Pozzi, Morbio Superiore (CH); Paolo Ienne, Pully (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 938 days.

(21) Appl. No.: 11/578,830

(22) PCT Filed: Apr. 19, 2005

(86) PCT No.: PCT/EP2005/051730
§ 371 (c)(1),
(2), (4) Date: Sep. 8, 2009

(87) PCT Pub. No.: WO2005/103904
PCT Pub. Date: Nov. 3, 2005

(65) Prior Publication Data
US 2010/0005272 A1 Jan. 7, 2010

(30) Foreign Application Priority Data
Apr. 20, 2004 (EP) .................... 04101629

(51) Int. Cl.
*G06F 12/08* (2006.01)
(52) U.S. Cl. .................. 711/137; 711/130; 711/213
(58) Field of Classification Search .................. None
See application file for complete search history.

(56) References Cited

U.S. PATENT DOCUMENTS

| | | | |
|---|---|---|---|
| 6,266,753 B1 * | 7/2001 | Hicok et al. | 711/202 |
| 6,560,688 B1 | 5/2003 | Qureshu et al. | |
| 2003/0079088 A1 | 4/2003 | Malik | |
| 2005/0071571 A1 * | 3/2005 | Luick | 711/137 |
| 2006/0129766 A1 * | 6/2006 | Cassia et al. | 711/137 |

OTHER PUBLICATIONS

T. Lee et al., "An Interface Methodology for Retargettable FPGA Peripherals" Proceedings of the International Conference on Engineering of Reconfigurable Systems and Algorithms 2003.

* cited by examiner

*Primary Examiner* — Than Nguyen
(74) *Attorney, Agent, or Firm* — Harness, Dickey & Pierce, P.L.C.

(57) ABSTRACT

Reconfigurable Systems-an-Chip (RSoCs) on the market consist of full-fledged processors and large Field-Programmable Gate Arrays (FPGAs). The latter can be used to implement the system glue logic, various peripherals, and application-specific coprocessors. Using FPGAs for application-specific coprocessors has certain speedup potentials, but it is less present in practice because of the complexity of interfacing the software application with the coprocessor. In the present application, we present a virtualisation layer consisting of an operating system extension and a hardware component. It lowers the complexity of interfacing and increases portability potentials, while it also allows the coprocessor to access the user virtual memory through a virtual memory window. The burden of moving data between processor and coprocessor is shifted from the programmer to the operating system.

6 Claims, 5 Drawing Sheets

VIRTUAL MEMORY WINDOW WITH DYNAMIC PREFETCHING SUPPORT

1 INTRODUCTION

Reconfigurable arrays might increase their relevance in future deep sub-micron technologies. This is due to increasing mask costs and the consequent need of designing individual Application-Specific Integrated Circuits (ASICs) as adaptations of generic platforms. However, in the foreseeable future, FPGAs will not be able to show speed or area efficiency comparable to general processors implemented in ASICs. Therefore, the bulk of computation in future high-performance SoCs will have to be performed by blending the two paradigms-standard processors augmented with reconfigurable application-specific parts. Major vendors of reconfigurable devices now offer systems consisting of processor cores surrounded by peripherals, on-chip memories, and large amounts of reconfigurable logic which may include special features such as embedded memories and arithmetic blocks suited for signal processing (e.g., Stratix family of Altera Corporation). Reconfigurable resources can be shared, physically and virtually partitioned between applications.

While partitioning applications (between hardware and software) for such devices, designers need to interface the application-specific coprocessor and account for different architectural details-bus hierarchies and protocols, shared and/or multi-ported memories, I/O ports, etc. For instance, programmers should be aware of the availability and size of shared memory accessible by the processor and FPGA; if such memory is smaller than a dataset to be processed, the dataset needs to be partitioned and partition transfers scheduled. Unpredictable memory accesses (e.g., processing objects on the heap) significantly complicate this conceptually easy task. Besides the design complexity, changing a host platform requires heavily redesigning both the software and hardware parts.

We introduce a shallow platform-specific hardware and an Operating System (OS) module that reduce the burden of software programmers and hardware designers. With them, coprocessors can access the user virtual memory through a virtual memory window. User applications and coprocessors become fully platform independent with only a limited penalty. Our contribution reduces the complexity of the programming and hardware-design paradigms and improves the portability of applications for reconfigurable platforms. By supporting the virtual memory address space sharing between an application and its coprocessor, the OS can enable a transparent way of interfacing: the OS hides the actual interface and automatically copies data from user memory to the coprocessesor memory and back. Besides providing the transparent interfacing, the use of OS can bring another advantage: the OS can be used to predict future memory accesses and fetch in advance data segments; in this way, by parallelising the coprocessor and the OS activities, it can even hide memory-to-memory latency.

2 GOALS

The programmer of a computing platform running an OS is abstracted from the characteristics of the memory system: he/she generates memory accesses ignoring whether the required main memory physically exists. The addresses known to the programmer are virtual and they describe a memory system with no relation to the real one. The Virtual Memory Manager (VMM) of the OS supports the programmer's illusion and it is assisted in hardware by the Memory Management Unit (MMU). The ability to support this illusion of a large homogeneous memory has two fundamental advantages: (a) the simplicity of the programming paradigm and (b) the portability of the code across systems supporting the same OS. The disadvantage is that the automatic allocation of pages by the operating system is, in general, sub optimal. In principle, an experienced programmer could obtain better results by managing directly the memory hierarchy, but in most cases people accept a small performance loss for the above-mentioned advantages.

We aim to extend these advantages to application-specific coprocessors (for instance, implemented in the FPGA on a reconfigurable SoC) working on behalf of a user-space application. Without loss of generality, we will concentrate on a virtual memory window built using a dual-port memory accessible by both the reconfigurable lattice and the processor. Our goal is to have an application (in a high-level language—C or C++) and the corresponding coprocessor (in a hardware description language—VHDL or Verilog) completely independent of the underlying hardware. An appropriately augmented OS, a compiler, and a synthesiser must be sufficient to port the accelerated application across different systems.

2.1 Virtual Memory Window

Nonstandard programming paradigms and HW/SW interfacing models have certainly hindered the acceptance of reconfigurable computing. The Virtual Memory Window (VMW) addresses these problems by reusing the simple and well known concept of virtual memory. The VMW enables the coprocessors to share the virtual memory address space with user applications, thus simplifying the programming paradigm and hardware interfacing.

The processing system according to the VMW concept comprises at least a central unit, a main memory and a peripheral, this peripheral accessing the memory at peripheral predefined addresses, and the central unit accessing the peripheral at central unit predefined addresses, wherein the access to the memory by the peripheral is made through an abstract identifier manager, said manager converting the peripheral predefined addresses to the central unit predefined addresses while accessing the memory.

It is to be noted that, even if this concept was first developed around reconfigurable peripheral, the present invention is not limited to this application and covers all type of peripheral such as coprocessor or hardware accelerator (encryption module, compression module). As an example, the peripheral described below is a reconfigurable coprocessor.

Analogously to virtual memory management, the programmer of a reconfigurable computer should design data exchanges between the processor (i.e., the application software) and the peripheral or coprocessor (e.g., the reconfigurable hardware) without any knowledge of the underlying physical system. Similarly, the peripheral (or coprocessor) designer should be exposed to the same abstraction and generate abstract addresses rather than specifying physical addresses of the directly-accessible memory. Data objects should be addressed transparently from platform limitations.

To allow this abstraction, a memory accessible directly by the FPGA is used as a coprocessor's Virtual Memory Window (VMW) to the virtual memory of the user application. As in the case of VMM, two elements are added to the basic system: (1) hardware device that performs the translation between the virtual addresses of abstract objects/elements and the corresponding physical addresses. We call this hardware, similar to a classic MMU, Window Management Unit (WMU); (2) support in the OS that allocates dynamically virtual memory regions and ensures that they are available to the coprocessor.

Similarly to the VMM, a Virtual Memory Window manager (VMW manager) handles the translation unit and the content of the window memory. The WMU sends an interrupt to the OS when the VMW manager needs to provide data to the coprocessor through the window.

BRIEF DESCRIPTION OF THE FIGURES

The description will be better understood thanks to the figures attached in which:

The FIG. 1 shows the general architecture using Virtual Memory Window

Figure 2:
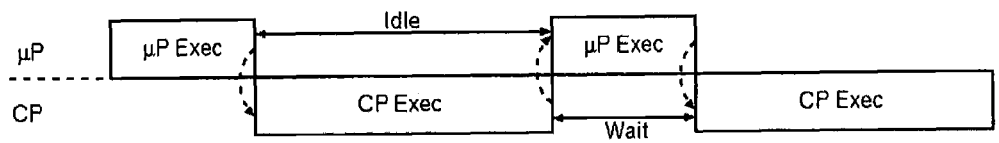

The FIG. 2 shows the timing diagram of the main processor

Figure 3:
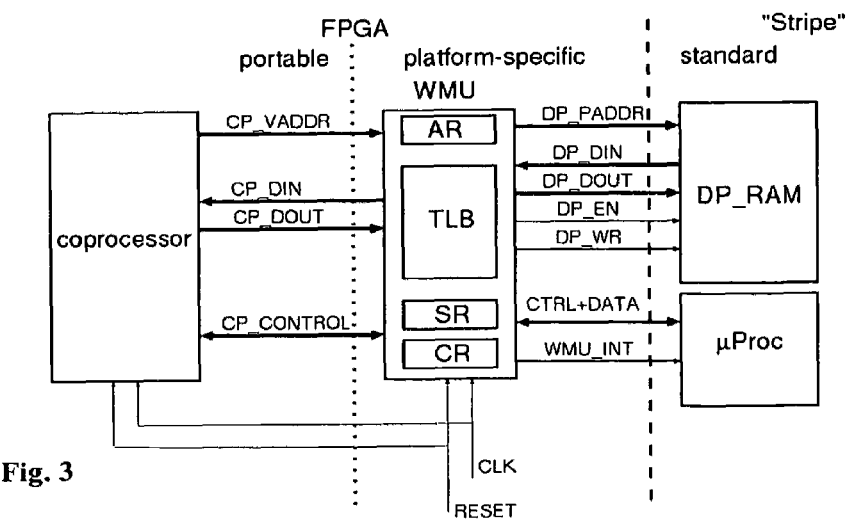

The FIG. 3 show a coprocessor and a processor connected though a VMW

Figure 4:
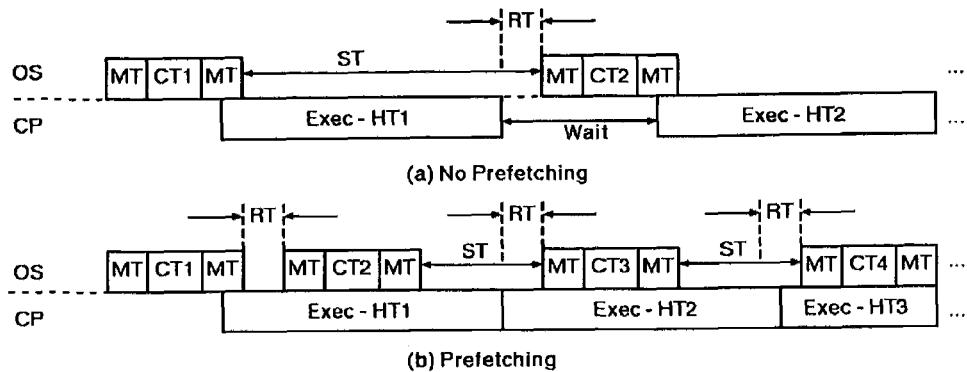
Figure 5:
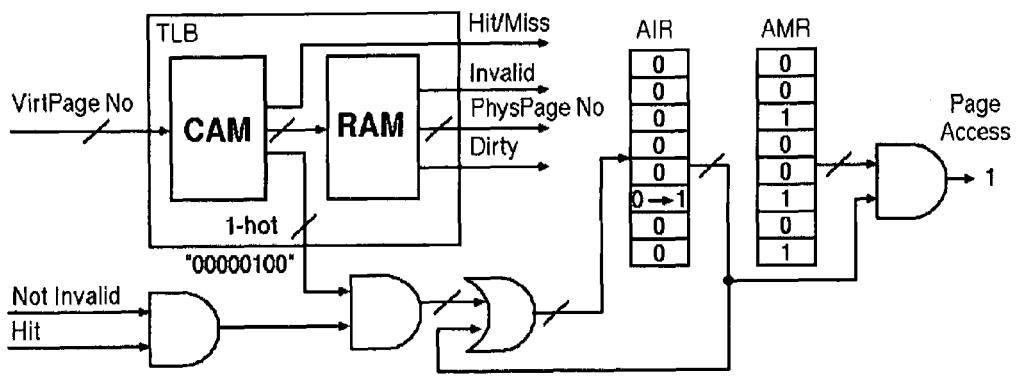
Figure 6:
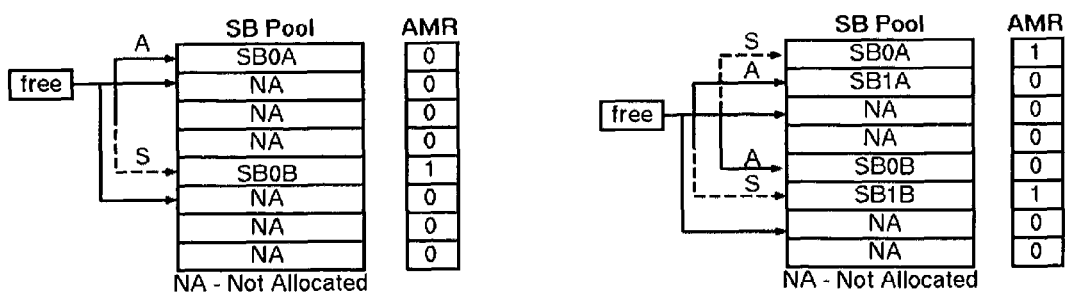
Figure 7:
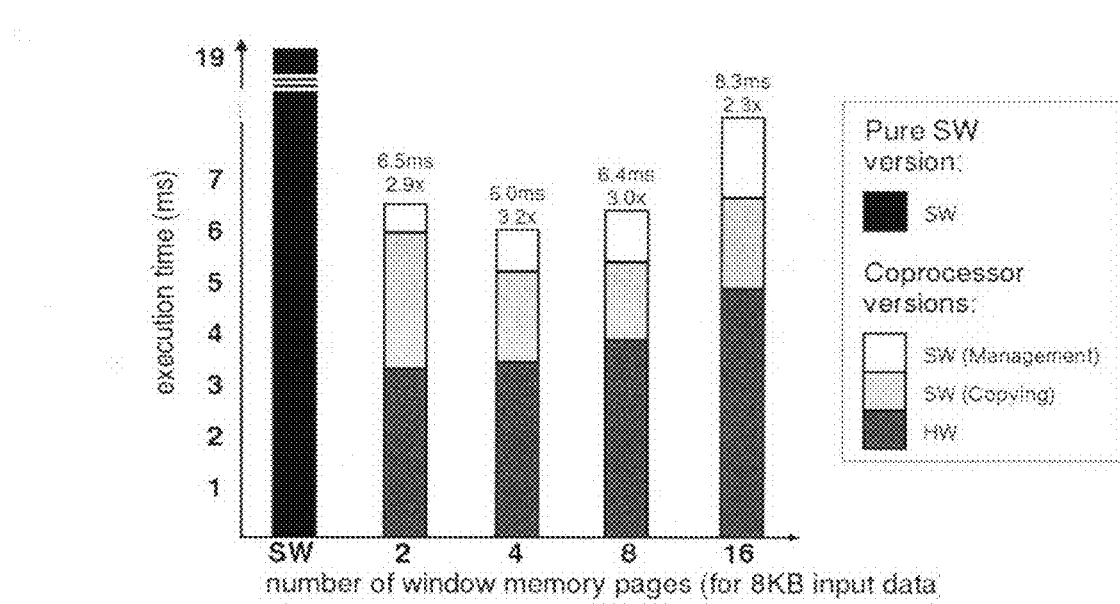
Figure 7:
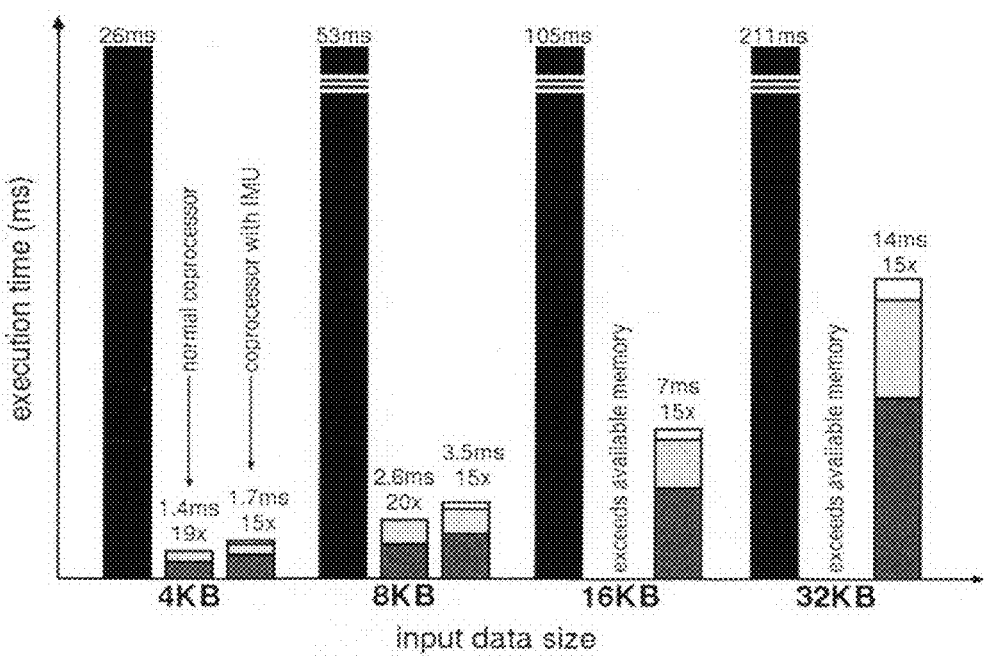
Figure 8:
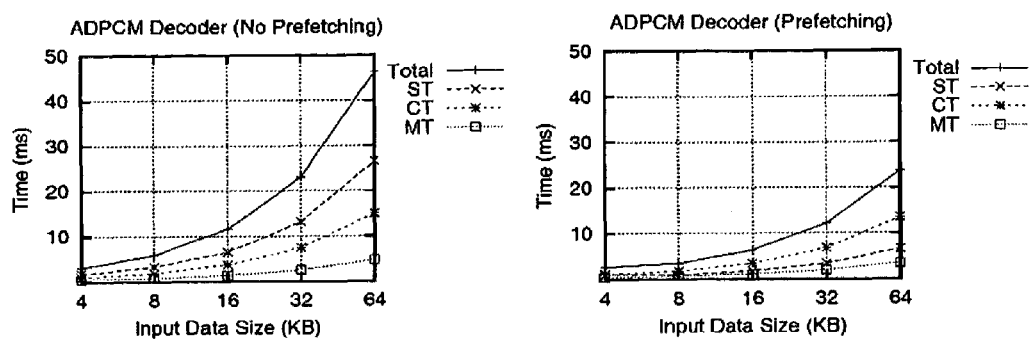
Figure 9:
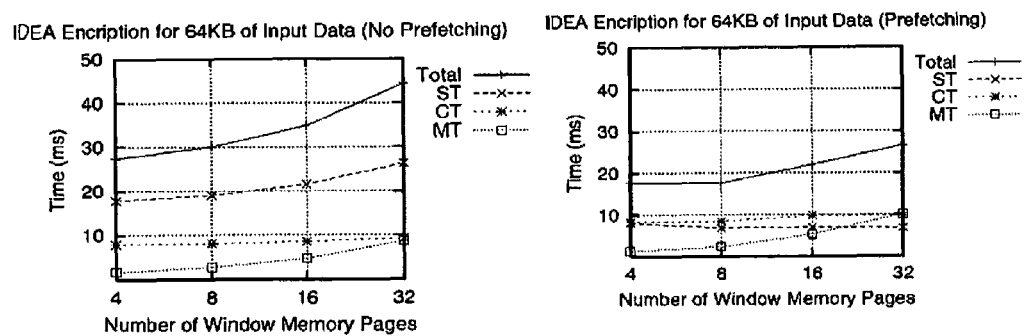
Figure 10:
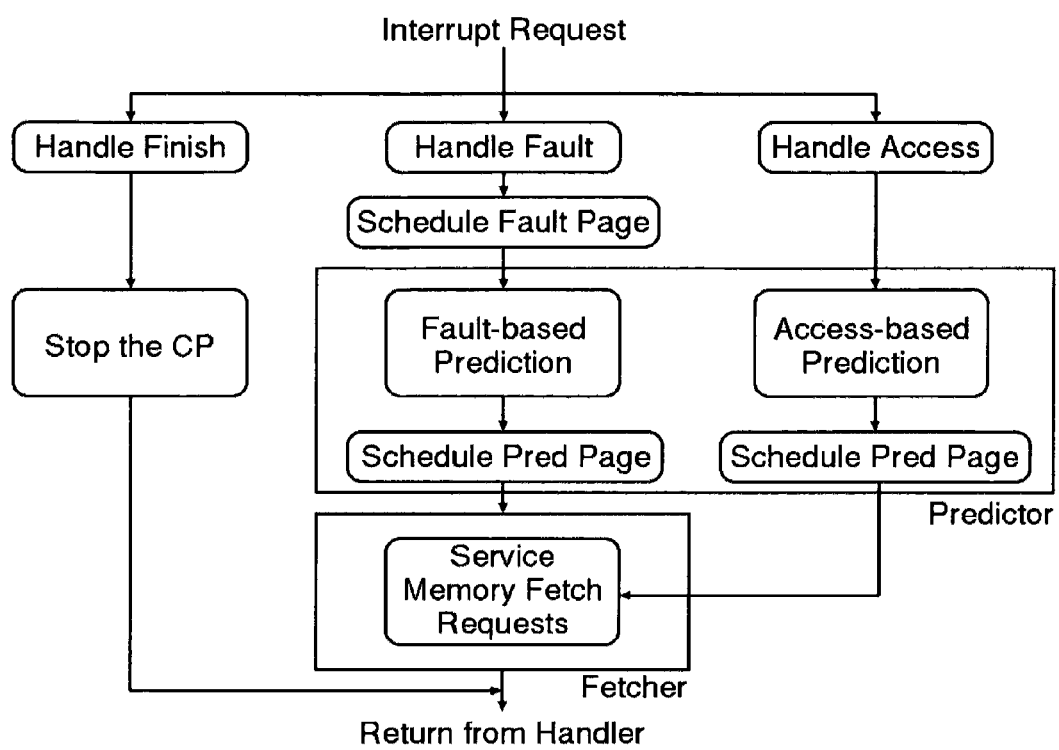

The FIGS. 4a and 4b show the sequence of the OS event during a VMW-based coprocessor execution The FIG. 5 shows the page access detection The FIG. 6 shows the stream buffer allocation The FIG. 7 shows the measurements on IDEA and ADPCM kernel The FIG. 8 shows the execution times with ADPCM decoder The FIG. 9 shows the execution times with IDEA encryption module The FIG. 10 shows a block diagram of a VMW manager

DETAILED DESCRIPTION OF THE INVENTION

Figure 1:
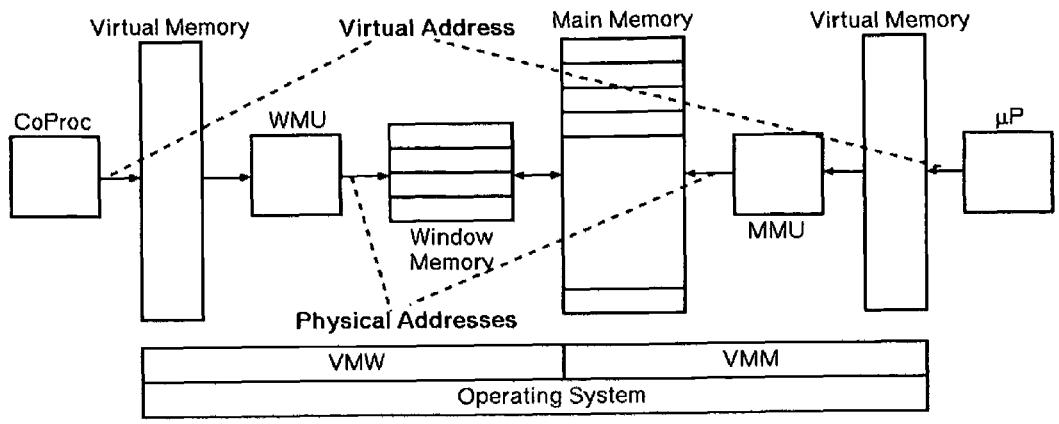

FIG. 1 shows how a reconfigurable coprocessor is interfaced with the main processor. The OS provides a uniform and abstract virtual memory image hiding all details about the physical memory. The fast translation from virtual to physical addresses is enabled by hardware accelerators: (1) Memory Management Unit (MMU) in the main processor case, and (2) Window Management Unit (WMU) in the coprocessor case. The Virtual Memory Manager (VMM) and Virtual Memory Window (VMW) Manager in the OS ensure that the translation is transparent to the end users. In the same manner as the VMM copies pages between the mass storage and the main memory, the VMW manager copies pages between the main memory and the window memory. Both managers do the tasks transparently from the end user.

Benefits of unifying the memory pictures from the main processor and the coprocessor side are: (1) programming software and designing hardware is made simpler-calling a coprocessor from a user application is as simple as a common function call, and designing the coprocessor hardware imposes no memory constraints but only requires complying to the WMU interface; (2) application software and accelerator hardware are made portable-hiding platform-related details behind the VMW manager and the WMU deliberates applications and coprocessor designs of platform dependence.

2.2 Motivating Example

```
/* Software version */
add_vectors (A, B, C, SIZE); ...
/* Typical coprocessor version */
data_chunk = DP_SIZE / 3; data_pt = 0;
while (data_pt < SIZE) {
    copy (A + data_pt, DP_BASE, data_chunk);
    copy (B + data_pt, DP_BASE + data_chunk, data_chunk);
    add_vectors_coprocessor( );
    copy (DP_BASE + 2*data_chunk, C+data_pt, data_chunk);
    data_pt += data_chunk;
```

-continued

```
} ...
/* VMW-based coprocessor version */
add_vectors_coprocessor(A, B, C, SIZE);
```

This example shows simplified pseudo-code excerpts of a trivial application that invokes either a software function or a hardware coprocessor to add two vectors (A and B) and store the result into a third one (C). The application is ported to three different systems: (1) pure software, (2) typical coprocessor, and (3) VMW-based coprocessor system. In the case of the typical coprocessor version, it can be seen that the programmer needs to take care about unnecessary platform related details (a similar task burdens the hardware designer). On the contrary, the VMW-based version completely resembles the pure software version and provides a clean and transparent interface to the coprocessor.

Besides simple interfacing, the VMW-based coprocessor system has another significant advantage: it makes use of the same virtual addresses (i.e., pointers) to access data, exactly as the user application does. Thus, the VMW-based system is capable of processing dynamically allocated data (e.g., objects scattered on the heap, linked lists) without any additional burden on the programmer's side. This feature can support use of application-specific coprocessors in object-oriented and runtime environments (e.g., Java Virtual Machine).

2.3 Improvement Potentials

The OS is not only limited to providing resource sharing and transparent interfacing: it can survey the execution of the coprocessor, optimise communication, and even adapt the interface dynamically. A virtualisation layer makes possible such improvements without any changes in the application and coprocessor code. Although it is intuitively expected that the additional layer brings overheads, it is shown here that this can bring advantages. In the present application, the strength of delegating the interfacing tasks to the OS is presented. As opposed to the simple execution model shown in FIG. 2 where the main processor is idle during the coprocessor busy time, the basic idea is to invest some portion of the idle time to anticipate and support future coprocessor execution. With the simple hardware support, the OS can predict coprocessor's memory accesses, schedule prefetches, and thus minimise the memory communication latency.

3 VIRTUALISATION COMPONENTS

We discuss here the three components that provide virtual memory abstraction to the coprocessor: (1) the standard OS service used to invoke the coprocessor, (2) the translation and interfacing hardware (WMU), and (3) the translation manager (VMW manager).

3.1 Coprocessor Invocation Service

A system call that is provided to software designers is called FPGA_EXECUTE. It passes data pointers and parameters, Initialises the WMU, launches the coprocessor, and puts the calling process in the sleep mode (avoiding consistency problems of simultaneous accesses to multiple data copies). FPGA_EXECUTE also informs the OS about the objects which require dynamic allocation. The software designer passes references to objects and their sizes to the coprocessor as-they-are, without any particular preparation; the hardware designer implements a coprocessor having in mind no specific data addresses—it fetches all necessary references through a standardised initialisation protocol. Finally, the coprocessor processes the objects with no concerns about their location in memory-translation of generated addresses is done by WMU and VMW manager.

3.2 Hardware Translation

All coprocessor memory accesses pass through the WMU, which is the coprocessor's interface to the system. If possible, virtual addresses demanded by the coprocessor are translated by the WMU to real addresses of the window memory region. Otherwise, an interrupt is generated and the OS handling is requested. Although it is excluded from the virtual memory mapping, the window memory region is managed by the OS and divided into pages to allow multiple virtual mappings.

FIG. 3 shows how the virtual addresses generated by a standardised coprocessor are translated by the WMU. The WMU in the FIG. 3 reflects the one implemented for our real system, described in Section 5. The standard interlace consists of virtual address lines (CP-VADDR), data lines (CP_DIN and CP_DOUT), and control lines (Cp-CONTROL). Control signals between the coprocessor and the WMU are the following: (1) CP_START, the coprocessor start signal, issued by the WMU once a user initiates the execution; (2) CP_ACCESS, the coprocessor access signal, indicates that there is an access currently performed by the coprocessor; (3) CP_WR, the coprocessor write signal, indicates that the access is a write; (4) CP_TLBHIT, the translation hit signal, Indicates that an address translation is successful—in order to proceed with a memory access, the coprocessor should first wait for this signal to appear; (5) CP_FIN, the coprocessor completion signal, indicates to the WMU that the coprocessor has finished its operation. Platform specific signals (e.g., the window RAM physical address lines DP_PADDR, data lines DP_DIN and DP_DOUT, and control lines DP_EN, DP_WR) connect the WMU with the rest of the system—and they are specific for different platforms. Inside the WMU, there are the three registers accessible by the main processor (AR, SR, and CR) and the Translation Lookaside Buffer (TLB) which emphasises the similarity of the WMU with a conventional MMU. Apart from typical status and control registers (SR and CR), the address register (AR) is examined by the OS, in order to determine which memory access caused an access fault. The main processor accesses the WMU using the separate control and data lines and it is informed about access faults by the WMU_INT interruption line.

The key part of the WMU is the TLB, performing address translation for coprocessor accesses. Its design is platform-specific as it reflects the organisation of the window memory region accessible by the coprocessor. As in typical VMM systems, the upper part of the coprocessor address (most significant bits) is matched to the patterns representing virtual page numbers stored in the translation table. If no match is found, the coprocessor operation is stalled and the OS management is requested. The TLB also contains invalidity and dirtiness information, like a typical MMU does.

Standard control signals between the coprocessor and the WMU are the following: (1) CP_START, the coprocessor start signal, issued by the WMU once a user initiates the execution; (2) CP_ACCESS, the coprocessor access signal, indicates that the coprocessor initiates a memory access; (3) CP_WR, the coprocessor write signal, indicates that the access is a write; (4) CP_TLBHIT, the translation hit signal, indicates that an address translation is successful-after initiating a memory access, the coprocessor should never continue its operation until this signal appears; (5) CP_FIN, the coprocessor completion signal, indicates to the WMU that the coprocessor has finished its operation.

Note that the interest here is not much in the implementation of a wrapper between two memory access protocols-one standardised and platform-independent and the other platform and memory specific; this is a well-studied topic in system-level design, as discussed in Section 6. The originality of our approach lays in the dynamic allocation of memory resources (i.e., shared or dual-port memory) between processor and coprocessor, which makes it possible for the application programmer to ignore the physical details of the resource. Such result can be achieved transparently through the Involvement of the OS as discussed below.

3.3 Window Management

The memory is logically organised in pages, as in typical memory systems. Multiple operating modes (i.e., different number of pages in the window memory) are supported by the WMU. Objects accessed by the coprocessor are mapped to these pages. The OS keeps track of the occupied pages and the corresponding objects. Not necessarily all of the objects processed by the coprocessor reside in the memory at the same time. At every point in time, the memory access patterns of the coprocessor determine the occupation of the available pages.

The VMW manager responds to the WMU requests. The OS determines the cause of the interrupt by examining the state of the WMU. There are two possible requests:

Page Fault. If the WMU signals a page fault, it means that the coprocessor attempted an access of an address not currently in the window memory. The OS rearranges the current mapping to the window memory in order to resolve it. It may happen that all pages are in use and in this case a page is selected for eviction (different replacement policies are possible-first-in first-out, least recently used, random). If the page is dirty, its contents are copied back to the user-space memory and the page is newly allocated for the missing data; the missing object part is copied from the user-space memory and the WMU state updated. Afterward, the OS allows the WMU to restart translation and lets the coprocessor exit from the stalled state.

End of Operation. Once the coprocessor finishes regularly its task, It signalises through the WMU the end of operation to the main processor. The window manager copies back to User space all the dirty data currently residing in the window memory. The coprocessor should be ready waiting for the next FPGA_EXECUTE call.

Besides window management, the OS provides also a parameter passing protocol. Once its operation is started, the coprocessor looks for parameters in a window memory page initially devoted to parameter passing. When the parameters are read, the coprocessor finishes initialisation and continues with normal operation. At the same time it invalidates the parameter-passing page, in this way making it available for future data mapping purposes.

Speculative actions such as prefetching could be used in order to avoid translation faults. The manager could detect coprocessor's memory access patterns, predict its future actions, and pre fetch the speculative pages. Although the interface management task is similar to a classic VMM, the application of such techniques for coprocessor interfacing is novel and brings new advantages.

3.4 Example

--- cycle 1:

CP_ADDR <= ptr_a; - object A[ ]
CP_ACCESS <= '1'; CP_WR <= '0';

cycle 2:

reg_a <= CP_DIN;
CP_ADDR <= ptr_b; - object B[ ]
CP_ACCESS <= '1'; CP_WR <= '0';

-continued

```
cycle 3:
    reg_b := CP_DIN;
    reg_c := reg_a + reg_b;
    CP_ADDR <= ptr_c; - object C[ ]
    CP_DOUT <= reg_c; CP..ACCESS <= '1';
    CP_WR <= '1';
    ptr_{a,b,c} <= ptr{a,b,c} + 1;
```

The coprocessor code using the WMU (see example above) computes the addition of two arrays: C[i]=A[i]+B[i]. For simplicity, this example omits the Implementation details of the finite state machine that switches between the three cycles, and no pipelining is assumed.

It is important to note that no physical address appears in the code. All of the generated addresses (prt_{a, b, c}) are virtual and provided through the initialisation. The WMU automatically translates this information into physical addresses, if possible, or invokes the OS, if the translation data are unavailable. This feature of the coprocessor code has several important consequences. First, no effort needs to be made by the coprocessor designer in order to perform physical address calculations tiresome task. More important, the software needs not be modified if the datasets to be exchanged exceed the memory available on the interface: the coprocessor can address arbitrarily large data. Finally, both the HDL and C code are now portable. The code is transparent not only to the address modality of the RAM (e.g., access rules)—as in many wrapper-based abstract interfaces such as [7]—but also to the overall memory size and allocation policy.

Example of Application C Code
int A[]; int B[]; int C[];...
PARAM[0].address=A; PARAM[0].size=SIZE;
PARAM[1].address=B; PARAM[0].size=SIZE;
PARAM[2].address=C; PARAM[0].size=SIZE;
FPGA_EXECUTE(PARAM);

This example shows how the C file which originally computed C[i]=A[i]+E[i] is modified to add calls to the FPGA, as described in Section 3.1. Essentially, FPGA_EXECUTE replaces a call add_vectors (A, B, C, SIZE) where nonscalar parameters are prepared and passed by reference.

4 OS-BASED PREFETCHING

In this section, the basic motivation for applying OS-based prefetch techniques is presented. Afterwards, hardware and software requirements to implement a prefetching system for a VMW are discussed in detail.

4.1 Memory Copy Overhead

The sequence of the OS events during a VMW-based coprocessor execution is shown in FIGS. 4a and 4b. Assuming a large spatial locality of coprocessor's memory accesses (e.g., stream oriented processing), it can be seen in FIG. 4a that the OS sleeps for a significant amount of time. Once the management is finished, the manager goes to sleep waiting for future coprocessor requests.

Instead of sleeping, the VMW manager could survey the execution of the coprocessor and anticipate its future requests, thus minimising the number of page misses. FIG. 4b shows hardware execution time overlapped with the VMW management activities. During coprocessor operation, the manager is informed by the WMU of the pages accessed by the coprocessor. Based on this information, the manager can predict future activities of the coprocessor and schedule prefetch-based loads of virtual memory pages. If the prediction is correct, the coprocessor can use the pre fetched pages without generating miss interrupts. In this way, the involvement of the operating system may completely hide the memory communication latency. The approach requires no action on the software programmer nor on the hardware designer side.

4.2 Hardware Support

The WMU provides hardware support for the translation of the coprocessor virtual addresses and to access the window memory. A simple extension to the WMU is introduced in this section in order to support detecting a page access. FIG. 5 contains the internal organisation of the WMU related to address translation. As in typical MMUs, address mapping is performed by a Translation Lookaside Buffer (TLB). If there is a match in the Content Addressable Memory (CAM), the 1-hot bit lines are used to set the appropriate bit in the Access Indicator Register (AIR). If the OS is interested in detecting the first access to a particular page, it simply sets the correct mask in the Access Mask Register (AMR). When the access appears, an interrupt is raised requesting OS handling.

Nested interrupts are prevented by the OS resetting to 0 the appropriate mask bit. While the interrupt is being handled, there is no need to stop the coprocessor interrupt handling and coprocessor run in parallel—the space is left for the speculative work. The OS actions need not be limited by this simple access detection mechanism. A more sophisticated but still reasonably simple hardware can be employed in order to support detection of more complex memory access patterns.

The WMU hardware can support detecting different memory access patterns. The VMW module can change during runtime the detection hardware being employed, until the best matching is achieved (or bail out if impossible to find a match). This adaptive and dynamic behaviour of the WMU may help detecting the access pattern of the current coprocessor and applying the best prediction policy with minimal miss rates. For example, in the case of a coprocessor parsing linked lists (or other data structures in the dynamic memory accessed by pointers) the WMU may use a history window for data coming to the coprocessor from the local memory. If the data previously stored in the history window later appears on the coprocessor address bus, the WMU reports to the VMW module a possible pointer-based processing. The VMW module can use this information to predict future accesses and prefetch the chained pages in advance.

4.3 Improved VMW Module

In order to support easily the prefetching, the VMW manager is improved (see FIG. 10). The three main design components of the VMW module are: (1) module initalisation and interrupt handling, (2) future access prediction, and (3) fetch mechanism of pages from main memory.

Interrupt Handling. Once invoked, the OS service first initialises the internal data structures and the WMU hardware. It then goes to sleep awaiting for interrupts. There are three possible interrupt types coming from the WMU: (1) Handle Finish, (2) Handle Miss, and (3) Handle Access as illustrated in the FIG. 10. When finished, the module returns control back to the user application. If a miss appears, the load of the miss page is scheduled into the fetch queue. Afterward, the predictor is called for the miss page to attempt predicting future page accesses and speculative pages are also scheduled for loading. The coprocessor is resumed by the fetcher, once all miss-related requests are satisfied. If an access appears, it indicates that the coprocessor accessed a page for which this information had been requested. The predictor is called to validate or confute its past predictions and schedule future page loads into the fetch queue. During the access handling, the coprocessor is active.

The Predictor. It attempts to guess future memory accesses and to schedule page loading. The only input parameters to the predictor are miss addresses and access page numbers i.e., there is no information about the state of the coprocessor. The approach is similar to classic prefetch techniques where no information is available about the instructions issued by the main processor but only the addresses on the bus. The current predictor assumes that for each miss a new stream is detected; thus, it requires a stream buffer allocation (i.e., a pair of the window memory pages, refer to FIG. 6) and schedules a speculative prefetch for the page following the missing one. By setting appropriately the AMR, it ensures that the WMU hardware will report the first access to the speculatively-loaded page. When the access is reported, the predictor is invoked again and, with this information confirming the correct speculation, further pre fetches are scheduled. Each speculative prefetch is designated to its corresponding stream buffer. Ideally, for a correctly-guessed memory access stream and good timing of the prefetching, only one miss per stream should appear: all others misses should be avoided by the prefetching.

Since the number of stream buffers is limited, the coprocessor may require more streams than it can be provided. In this case, a stream buffer should be selected for deallocation, to satisfy a new allocation request. For the moment, a simple eviction policy is implemented; yet, the predictor being completely in software, more sophisticated eviction policies can be easily added. Furthermore, potential trashing and deadlocks (due to the capacity problems of the window memory) can be resolved dynamically and transparently for the end-user simply by changing the operation mode of the WMU.

Having the page access detection hardware, one can use prediction techniques more sophisticated than the sequential one. For example, in the case of irregular memory accesses, the VMW module can be extended to build the memory access history in the process of learning. Afterward, it can use stochastic methods (like Markov chains) to model the access behaviour and predict future accesses. The VMW module can implement multiple prediction techniques and use heuristics to choose the best one for a particular coprocessor. This can be done dynamically, at runtime, transparently to the programmer.

The Fetcher. The fetcher is responsible for loading pages from/to User space memory. It is designed to be implemented as a separate execution thread. The memory requests are scheduled by the miss handler and by the predictor, with miss-generated requests always scheduled before speculative ones. The fetcher executes the fetch queue, until all the requests are satisfied. It determines the type of the fetch (mandatory or speculative), its destination in the windows memory, and whether it requires a stream buffer allocation. If the destination is occupied by a dirty page, it is copied back to the User space. The page is then fetched from the User memory and the request is fulfilled. The coprocessor can be resumed if needed-if the fulfilled request is miss-based and there are no outstanding miss-based requests. Fulfilled requests are deleted from the queue and the procedure is repeated until all the requests are serviced.

5 EXAMPLE OF IMPLEMENTATION

A VMW system is implemented using a board based on the Altera Excalibur EPXA1 device. The device consists of a fixed part, called ARM-stripe, and of reconfigurable logic, called PLD. The ARM-stripe includes an ARM processor running at 133 MHz, peripherals, and on-chip memories. The board is equipped with 64 MB of SDRAM and 4 MB of FLASH, and runs the Linux OS.

The WMU is designed in VHDL to be synthesised together with a coprocessor. The TLB, the most critical part of the WMU, is implemented using content addressable and RAM memories available in the PLD part of the EPXA1 device. Due to the limitations of the technology, the translation is performed in multiple cycles. Although we had to implement the WMU in FPGA for these experiments, WMUs should, in principle, become standard components implemented on the ASIC platform in the same way as MMUs. Currently, if we assume no translation faults, four cycles are needed from the moment when the coprocessor generates an access to the moment when the data is read or written. The performance drop caused by multiple translation cycles could be overcome by pipelining.

Through the WMU, the coprocessor is interfaced with the dual-port RAM memory, an on-chip memory accessible by both PLD (directly) and the main processor (through an AMBA Advanced High-performance Bus-AHB). Depending on the WMU operating mode, the memory is logically organised in 2-32 pages with respective page sizes 8-0.5 KB (the total size is therefore 16 KB). It has been chosen for the window memory because of direct and easy interfacing with PLD. The VMW manager with pre fetching support is implemented as a Linux kernel module for the particular system. Using the module on the system with different sizes of dual-port memory (e.g., the Altera devices EPXA4 and EPXAIO) would require only recompiling the module. The user application would immediately benefit without need to recompile.

5.1 Basic Measurements

The viability of this approach was proven on two designs: a cryptography application, IDEA (running at 6 MHz), and a common multimedia benchmark, adpcmdecode (running at 40 MHz). For both, the critical parts were implemented in VHDL as standard coprocessors using the WMU interface. The original C code was manually modified to make use of the OS service provided by the VMW manager and described in Section 3.

FIG. 7 shows the execution times of the benchmarks. The IDEA results are shown for pure software, for a typical coprocessor (without OS), and for a VMW-based version of the benchmark, with different input data sizes. The complex IDEA coprocessor core runs at 6 MHz and has 3 pipeline stages. The WMU and the IDEA memory subsystem run at 24 MHz and the synchronisation with the IDEA core is provided by a stall mechanism. IDEA's hardware parallelism is limited by the PLD resources of the device used; with larger PLDs, additional speedup could be obtained. The results for adpcmdecode are shown for pure software and for VMW-based versions of the application, using different WMU operating modes. The adpcmdecode coprocessor and the WMU are running at the frequency of 40 MHz. Both adpcmdecode versions are running on top of the OS. The adpcmdecode application produces four times more data than it consumes (e.g, one input page of data produces four output pages). Despite the incurred overhead of the VMW-based versions, both coprocessors achieve significant speedup compared to the software case (especially in the case of the IDEA benchmark).

For the VMW-based versions, three components of the execution time are measured: (1) hardware execution time-time spent in the coprocessor and in the WMU, required for computation, memory accesses, and virtual memory translations; (2) software execution time for window memory copying-time spent in transferring data from/to user-space memory; and (3) software execution time for the WMU management-time spent in checking which address has generated the fault, selecting a page for eviction, and updating the translation table. In the VMW case, the software periods are spent in the OS module. For IDEA (VMW-based version), when the data set size grows, capacity misses appear (from 8 KB onwards). Additional time is spent in the OS for the management but the speedup is only moderately affected. Programming is made easier (both in C and VHDL) because no explicit reference to the dual-port memory is required: It is important to stress that all of the experiments are performed by simply changing the input data size, without the need of modifying neither the application code, nor the coprocessor design. In particular, no modifications are needed even for datasets which cannot be stored at once in the physically available dual-port memory.

For the VMW-based version of adpcmdecode, changing the number of window memory pages (i.e., changing WMU operating modes) within a reasonable range does not dramatically affect the speedup of the coprocessor. As expected, the management time increases with the number of pages, while the copying time is almost constant (except when the window memory has only two pages, where the behaviour of adpcmdecode and the simple allocation policy trigger conflict misses and some additional copies are required).

A few conclusions can be drawn from FIG. 7. First, the presence of our virtualisation layer adds portability benefits and still provides significant advantage over the pure software version (even if the difference of running frequencies for the ARM processor and the PLD is not negligible). Second, the introduced overhead can be considered acceptable: the software execution time for WMU management can be seen in the FIG. 7 and it is between 5-12% of the total execution time (for an optimal number of pages). The hardware execution time includes the overhead of address translation and the OS response time. This overhead is not always negligible (in the IDEA case around 20%) but it can be reduced: one should consider making the WMU a standard VLSI part present on a SoC (exactly as the MMU which is already present on the chip we use). Although a significant amount of time is spent in copying to/from the window memory, a considerable part of this time is contributed by compulsory page misses and would be unavoidable even if no virtualisation was applied. The number of page misses can be reduced by smarter memory allocation and prefetching techniques—the latter allowing overlapping of processor and coprocessor execution.

To conclude, one can notice that if the same experiments were to be performed on a different platform this would require porting the WMU HW and the VMW SW, but would not require any changes to the coprocessor HDL description nor to the application C code.

5.2 Prefetching-related Measurements

The two applications are also used to measure the benefits of prefetching techniques. Notice that no change has been made to the user C and VHDL code to take advantage of prefetching—the code is exactly the same developed in previous development, and only the WMU and the VMW manager differ (since they are now redesigned to support the pre fetching).

FIG. 8 compares total execution times of ADPCM decoder with and without prefetching in the VMW module. Although running at the same speed, in the prefetching case the coprocessor finishes its task almost twice as fast compared to the nonprefetching case. As indicated in FIG. 4, the sleep time reduces: the module handles access requests in parallel with the execution of the coprocessor. Counter intuitively, the management time slightly decreases because the number of miss-originated interrupts is dramatically lower (e.g., in the case of 32 KB input data size it goes down from 48 to only 2). Meanwhile, multiple access-originated interrupts may appear within a relatively short time interval (e.g., two streams usually cross the page boundary at about same time) and the VMW manger services them at the same cost. This is not the case for the misses: for a miss to appear, the previous miss need to be already serviced.

The ADPCM decoder has a specific access pattern: the decoder is producing four times more data than it consumes. Due to the simple FIFO policy used for page eviction in the nonprefetching case, it may happen that a page still being used gets evicted: the page will need to be reread before the coprocessor continues the execution. On the other hand, the prefetching approach with the stream buffer allocation is less sensitive to the applied page eviction policy because for input and output streams distinct stream-buffers are allocated.

FIG. 9 shows total execution times of IDEA encryption for different number of the window memory pages. A significant improvement in the IDEA execution time is achieved with prefetching. Having larger data structures to manage, management time increases with the increasing number of the window memory pages. In the pre fetching case, it is slightly larger than without prefetching. With smaller page sizes, manage and copy time intervals become comparable to the hardware execution Intervals: increasingly often, the coprocessor generates a miss while the missing page is already being prefetched. This miss is called a late miss, and it is less costly than a regular one. Still, the VMW manager needs to acknowledge them once its corresponding prefetch is finished-hence the slight increase in the management time.

| Number of Pages | Page Size | Non prefetching misses | Misses | Prefetching Late Misses | Accesses |
|---|---|---|---|---|---|
| 4 | 4 KB | 32 | 2 | 0 | 15 |
| 8 | 2 KB | 64 | 2 | 2 | 31 |
| 16 | 1 KB | 128 | 2 | 24 | 63 |
| 32 | 0.5 KB | 256 | 3 | 53 | 131 |

This shows how the number of miss-originated and access-originated interrupts grows with smaller page sizes. It also shows how late misses start to appear.

Although it seems costly to manage larger number of window memory pages, in some cases the flexibility of the WMU and the VMW manager may be required, since the WMU operation mode can affect the performance. For example, supposing only two window memory pages, the coprocessor with pre fetching experiences memory trashing problems and performs dramatically slower then the nonprefetching one (e.g., for the IDEA encryption on 16 KB input data and two 8 KB pages in the window memory, 757 ms vs. 7 ms, and 1366 vs. 6 misses!). It is the task of the VMW module to detect this misbehaviour and change to the operation mode that corresponds better to the coprocessor needs.

6 RELATED WORK

Memory abstraction and communication interfaces definition are active field of research, motivated by IP-reuse and component-based system design. Many standardisation efforts are made in order to facilitate IP interconnection— e.g., standardised buses. Another industry standard [C. K. Lennard, P. Schaumont, G. De Jong, A. Haverinen, and P. Hardee. Standards for system-level design: Practical reality or solution in search of a question? In Proceedings of the Design, Automation and Test in Europe Conference and Exhibition, pages 576-83, Paris, March 2000] provides a bus abstraction which makes the details of the underlying interface transparent to the designer. Some authors show ways of automatically generating memory wrappers and interfacing IP designs [F. Gharsalli, S. Meftali, F. Rousseau, and A. A. Jerraya. Automatic generation of embedded memory wrapper for multiprocessor SoC. In Proceedings of the 39th Design Automation Conference, New Orleans, La., June 2002]. In [T.-L. Lee and N. W. Bergmann. An interface methodology for retargetable FPGA peripherals. In Proceedings of the 3rd International Conference on Engineering of Reconfigurable Systems and Algorithms (ERSA), Las Vegas, Nev., June 2003], an interfacing layer is presented to automate the connection of IP designs to a wide variety of interface architectures. The main originality of the present application, is not in the standardisation and abstraction of the memory interface details (signals, protocols, etc.) between generic producers and consumers, but in the dynamic allocation of the interfacing memory, buffer, or communication ports between a processor and a coprocessor—that is in the implication of the OS in the process.

Similarly, extensive literature exists on the design and allocation of application-specific memory systems, typically for ASIC design. Mostly, these are compiler-based static techniques consisting in software transformations to exploit better a given memory hierarchy, and in design methodologies for customising the ASIC memory hierarchy itself for specific applications. The former techniques can be used proficiently to enhance the design of coprocessor such as those addressed here, but are rather independent from the actual interface details we handle. On the other hand, a few works have a dynamic flavour and could therefore be used to improve the interface memory allocator-they are fully complementary to the present techniques [M. Leeman, D. Atienza, C. Ykman, F. Catthoor, J. M. Mendias, and G. Deconcinck. Methodology for refinement and optimization of dynamic memory management for embedded systems in multimedia applications. In IEEE Workshop on Signal Processing Systems, Seoul, August 2003]. In the area of memory systems for reconfigurable systems, works such as [M. Herz, R. Hartenstein, M. Miranda, E. Brockmeyer, and F. Catthoor. Memory addressing organisation for stream-based reconfigurable computing. In Proceedings of the 9th IEEE international Conference on Electronics, Circuits and Systems, Dubrovnik, Croatia, September 2002] study the generation of optimal access patterns for coprocessors within SoC architectures; the focus is not in portability and abstraction from architectural details, as in this application. Although we only use simple access patterns for validation, any access pattern could be used in conjunction with the WMU. In this way, their address generation techniques are complementary to our work.

Closer to our concerns is a different form of hardware virtualisation which has received some attention recently. With motivations similar to ours, researchers have considered the OS support required for managing the reconfigurable lattice across tasks—the purpose is to screen the user from the problems introduced by the finite amount of available reconfigurable logic. In [M. Dales. Managing a reconfigurable processor in a general purpose workstation environment. In Proceedings of the Design, Automation and Test in Europe Conference and Exhibition, Munich, March 2003], an architecture is introduced to have the OS sharing dynamically the reconfigurable logic between applications. The resource is virtualised and hardware support is developed in order to support the mapping between the virtual and the physical resource. The type of virtualisation we introduce addresses the processor/lattice interfacing rather than the reconfigurable lattice itself; the two problems are therefore orthogonal and complementary-future system may have to implement solutions for both. Finally, in [V. Nollet, P. Coene, D. Verkest, S. Vernalde, and R. Lauwereins. Designing an operating system for a heterogeneous reconfigurable SoC. In Reconfigurable Architectures Workshop (RAW), Proceedings of the International Parallel and Distributed Processing Symposium, Paris, June 2003], an OS for reconfigurable platforms is proposed that suggests a task communication scheme based on message passing. It exposes the communication to the programmer and it differs from our approach.

Hardware and software pre-fetching techniques are originally developed for cache memories to support different memory access patterns. Stream buffers are introduced as an extension of tagged-based prefetching to improve sequential memory accesses. Other techniques exist that cover nonsequential memory accesses (e.g., recursive and correlation based where a user-level thread correlation pre fetching is shown). Hardware prefetching techniques have also been used for configurable processors. Besides caching, prefetching techniques have been used for efficient virtual memory management: in hardware (e.g., speculatively preloading the TLB to avoid page faults) and in software (prefetching virtual memory pages for user application).

The prefetching technique presented in this application is in its essence a dynamic software technique with limited hardware support. Its strongest point is the transparency: neither user applications nor hardware accelerators are aware of its presence. Even more importantly, an OS module is developed to optimise execution of coprocessors, and it is not limited to the presented technique.

7 CONCLUSION

In this application we add a Virtual Memory Window for virtual memory accesses to a reconfigurable computing platform. It provides a straightforward programming paradigm and makes reconfigurable applications completely portable. An OS module supporting the execution of reconfigurable coprocessors is designed for the VMW framework. Not only it allows the coprocessors to share transparently the same address space with user applications, but it also makes possible advanced and yet simple runtime optimisations, without any intervention by the end user.

The idea of virtualisation is not to improve the performance of the reconfigurable system; as in most related computer architecture ideas such as virtual memory management, the goal is to pay a minimal performance tag for the ease of programming and portability advantages. To quantify the overall benefits, we have tested the approach on a real system equipped with an operating system; we ran a simple multimedia application and a complex cryptographic algorithm, both enhanced with application-specific coprocessors of different complexity. The overhead incurred due to the presence of the virtualisation layer is generally limited, but we are aiming to reduce it further. In both cases the coprocessors achieve a significant speedup compared to software-only execution, with minimal changes in the application code.

In order to demonstrate the advantages of delegating the interfacing task to the OS, a stream-based memory prefetch technique was implemented within the OS module (with a simple hardware support in the WMU). A significant execution time improvement is demonstrated for the two application-specific reconfigurable coprocessors, without any change in either application software or coprocessor hardware.

We believe that the interface virtualisation as the first step is a key issue for the future of reconfigurable computing. It helps bringing reconfigurable hardware up to the programming paradigm of general computing-a goal which can be most easily achieved by involving the OS. The research should address the development of efficient optimisations in the OS. The goal is to expose almost completely the inherent speed-up achievable by specialised hardware execution. Future extensions of this work are not limited to implementing other prefetch techniques (e.g. recursive and correlation-based prefetching): the involvement of the OS enables novel runtime optimisations (e.g., changing the number and size of window memory pages in order to fit better application needs).

The invention claimed is:

1. A processing system comprising:
   at least a central unit;
   a main memory; and
   a peripheral, this peripheral accessing the main memory at peripheral predefined addresses, and the central unit accessing the peripheral at central unit predefined addresses, wherein the access to the main memory by the peripheral is made through an abstract identifier manager, said manager converting the peripheral predefined addresses to the central unit predefined addresses while accessing the main memory, and wherein the system further comprises:
   a shared memory usable by both the central unit and the peripheral, said manager being configured to copy data objects or fragments thereof needed by the peripheral between the shared memory and the main memory; and
   additional analysing means to predict useful data objects or fragments thereof for the peripheral and comprises additional buffer means in the shared memory to copy in advance such objects or fragments thereof to and from the shared memory.

2. The processing system of claim 1 wherein the analysing means further comprises means to validate or confute the past prediction.

3. The processing system of claim 1 wherein the analysing means further comprises means to schedule future page loads into a fetch queue.

4. The processing system of claim 1 wherein the analysing means detects the needed data from the central unit predefined address.

5. The processing system of claim 1 wherein the analysing means further comprises a history memory which is used to predict the data to be copied in advance.

6. The processing system of claim 1 wherein the analysing means further comprises detecting means to detect a pointer address into the data returned to the peripheral and load in advance the data pointed by said address.

* * * * *